| (12) | United States Patent<br>Yang et al. | (10) Patent No.: US 10,761,374 B2<br>(45) Date of Patent: *Sep. 1, 2020 |
|---|---|---|

(54) LIQUID CRYSTAL DISPLAY INCLUDING PROTRUSIONS IN A LIQUID CRYSTAL LAYER

(71) Applicant: SAMSUNG DISPLAY CO., LTD., Yongin-si, Gyeonggi-do (KR)

(72) Inventors: Gi Hoon Yang, Ansan-si (KR); Ju Young Sung, Cheonan-si (KR); Min Ki Kwon, Cheonan-si (KR); Chu Young Seo, Asan-si (KR); Bo Seul Lee, Seoul (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 50 days.

This patent is subject to a terminal disclaimer.

(21) Appl. No.: 16/138,274

(22) Filed: Sep. 21, 2018

(65) Prior Publication Data

US 2019/0265553 A1 Aug. 29, 2019

(30) Foreign Application Priority Data

Feb. 23, 2018 (KR) ........................ 10-2018-0022152

(51) Int. Cl.
*G02F 1/1337* (2006.01)
*G02F 1/1335* (2006.01)
(Continued)

(52) U.S. Cl.
CPC .... *G02F 1/133707* (2013.01); *C09K 19/3402* (2013.01); *C09K 19/3441* (2013.01);
(Continued)

(58) Field of Classification Search
CPC ............. C08F 122/20; C08F 2220/302; C09K 19/3402; C09K 19/3441; C09K 19/38;
(Continued)

(56) References Cited

U.S. PATENT DOCUMENTS 10,620,480 B2 * 4/2020 Yang ...................... C08F 122/16
2004/0174476 A1 * 9/2004 Yeh ...................... G02F 1/133512
349/110

(Continued)

FOREIGN PATENT DOCUMENTS

KR 1020060028536 3/2006
KR 1020130015734 2/2013

(Continued)

*Primary Examiner* — Sophie Hon
(74) *Attorney, Agent, or Firm* — F. Chau & Associates, LLC

(57) ABSTRACT

A liquid crystal display according to an exemplary embodiment of the present invention includes: a first display panel and a second display panel. A liquid crystal layer is between the first display panel and the second display panel with a sealant therebetween. The first display panel includes a display area and a non-display area. First light blocking members are disposed in the non-display area. The liquid crystal layer includes a plurality of liquid crystal molecules and a plurality of protrusions. The protrusions are adjacent to at least one of the first display panel or the second display panel. The protrusions include a polymer including a compound represented by Chemical Formula 1 or a polymer including a compound represented by Chemical Formula 2:

[Chemical Formula 1]

$$A_1 \diagdown \diagup \diagdown_{A_2} \diagdown \diagdown \diagup \diagdown \diagup \diagdown_n O \diagdown \diagup \diagdown \diagup \diagdown_{P_1}$$

(Continued)

-continued

[Chemical Formula 2]

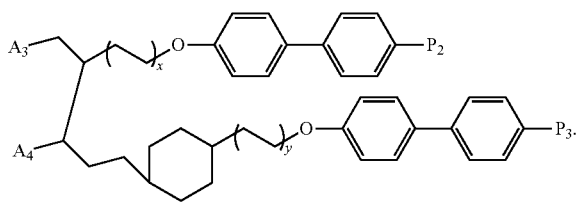

20 Claims, 7 Drawing Sheets

(51) Int. Cl.
    G02F 1/1339    (2006.01)
    G02F 1/1343    (2006.01)
    C09K 19/34     (2006.01)
    C09K 19/38     (2006.01)
    C08F 122/20    (2006.01)
    C09K 19/04     (2006.01)
    C08F 220/30    (2006.01)

(52) U.S. Cl.
    CPC ............ *C09K 19/38* (2013.01); *G02F 1/1339*
        (2013.01); *G02F 1/133512* (2013.01); *G02F
        1/133514* (2013.01); *G02F 1/133711*
        (2013.01); *G02F 1/134309* (2013.01); *C08F
        122/20* (2013.01); *C08F 220/302* (2020.02);
        *C09K 2019/0448* (2013.01); *G02F
        2001/133726* (2013.01); *G02F 2202/022*
        (2013.01); *Y10T 428/1005* (2015.01)

(58) Field of Classification Search
    CPC ....... C09K 2019/0448; G02F 1/133512; G02F
        1/133514; G02F 1/133707; G02F
        1/133711; G02F 1/1339; G02F
        2001/133726; G02F 2202/022; Y10T
        428/1005
    See application file for complete search history.

(56) References Cited

U.S. PATENT DOCUMENTS

| 2005/0219442 | A1* | 10/2005 | Yang | G02F 1/133528 |
| | | | | 349/106 |
| 2013/0314655 | A1 | 11/2013 | Archetti et al. | |
| 2018/0129087 | A1* | 5/2018 | Yang | C09K 19/3066 |

FOREIGN PATENT DOCUMENTS

| KR | 1020140047589 | 4/2014 |
| KR | 101552902 | 9/2015 |
| KR | 1020170014049 | 2/2017 |
| KR | 1020170088282 | 8/2017 |
| KR | 1020180051726 | 5/2018 |
| WO | 2012104008 | 8/2012 |

* cited by examiner

LIQUID CRYSTAL DISPLAY INCLUDING PROTRUSIONS IN A LIQUID CRYSTAL LAYER

CROSS-REFERENCE TO RELATED APPLICATION

This application claims priority to Korean Patent Application No. 10-2018-0022152 filed in the Korean Intellectual Property Office on Feb. 23, 2018, the disclosure of which is incorporated by reference herein in its entirety.

(a) TECHNICAL FIELD

Exemplary embodiments of the present invention relate to a liquid crystal display, and more particularly, to a liquid crystal display including protrusions in a liquid crystal layer.

(b) DISCUSSION OF RELATED ART

A liquid crystal display (LCD) may include a liquid crystal layer where an electric field generated by field generating electrodes such as a pixel electrode, and a common electrode is formed. In the liquid crystal display, an electric field may be generated in the liquid crystal layer. A direction of liquid crystal molecules of the liquid crystal layer may be determined by the electric field, and an image may be displayed by adjusting transmittance of light that passes through the liquid crystal layer.

Among the liquid crystal display, a vertically aligned mode liquid crystal display in which long axes of liquid crystal molecules are aligned to be perpendicular to top and bottom display panels while no electric field is applied may have a relatively large contrast ratio and a relatively wide reference viewing angle.

The liquid crystal molecules can be vertically aligned by using an alignment layer.

SUMMARY

According to exemplary embodiment of the present invention, a leakage of light in a non-display area of a liquid crystal display may be reduced or eliminated.

A liquid crystal display according to an exemplary embodiment of the present invention includes a first display panel and a second display panel that are disposed facing each other. A liquid crystal layer is disposed between the first display panel and the second display panel. A sealant is disposed between the first display panel and the second display panel. The first display panel includes a display area and a non-display area adjacent to the display area. First light blocking members are disposed in the non-display area. The first light blocking members include red color filters and blue color filters that are disposed on the red color filters. The liquid crystal layer includes a plurality of liquid crystal molecules and a plurality of protrusions. The protrusions are adjacent to at least one of the first display panel or the second display panel. The protrusions include a polymer including a compound represented by Chemical Formula 1 or a polymer including a compound represented by Chemical Formula 2:

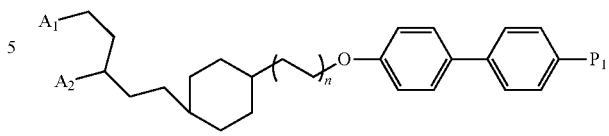

[Chemical Formula 1]

In Chemical Formula 1: $A_1$ and $A_2$ are each selected from –H, —OH,

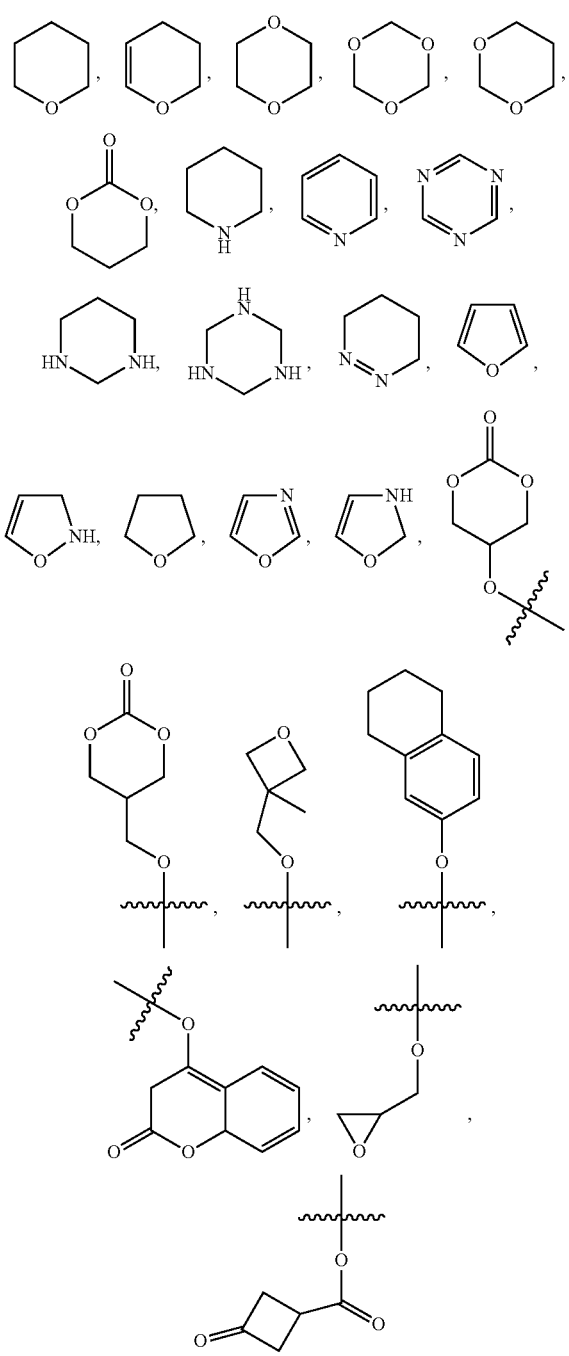

$A_1$ and $A_2$ are not simultaneously —H, $P_1$ is selected from

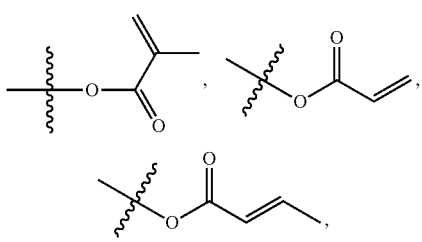

and n is an integer selected from 1 to 12.

[Chemical Formula 2]

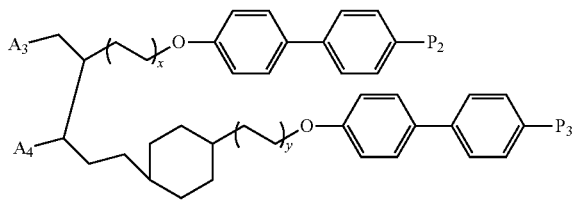

In Chemical Formula 2: $A_3$ and $A_4$ are each selected from —H, —OH,

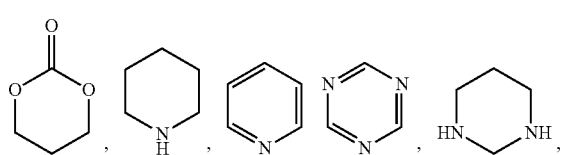

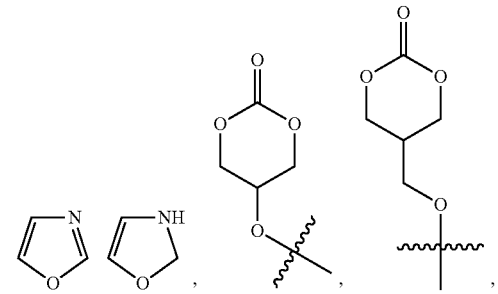

-continued

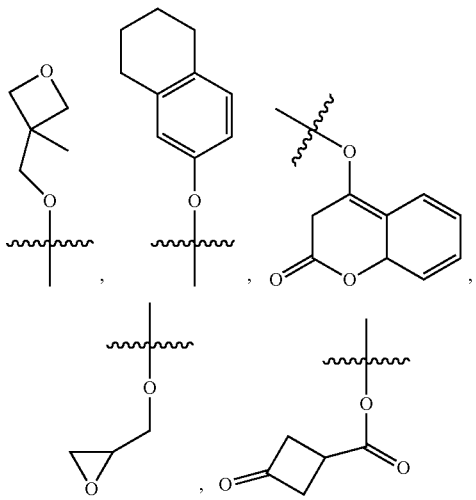

$A_3$ and $A_4$ are not simultaneously —H, $P_2$ and $P_3$ are each selected from

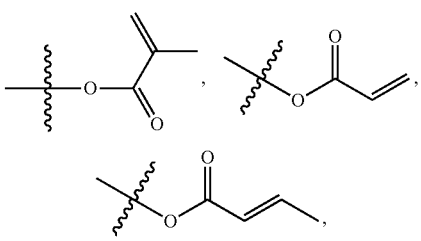

and x and y are each an integer selected from 1 to 12, and x is an integer lower than y.

The protrusion may include a polymer including a compound represented by Chemical Formula 1, and the liquid crystal layer may include a reactive mesogen.

The compound represented by Chemical Formula 1 may be a compound represented by Chemical Formula 1-1:

[Chemical Formula 1-1]

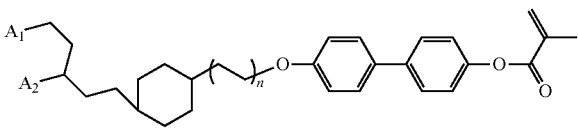

In Chemical Formula 1-1: $A_1$ and $A_2$ are each selected from —H, —OH,

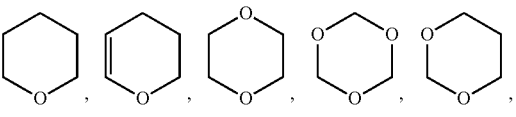

-continued

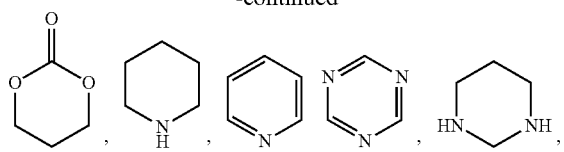

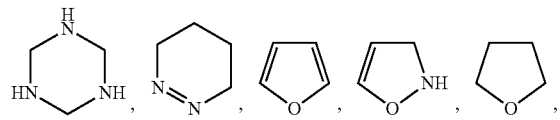

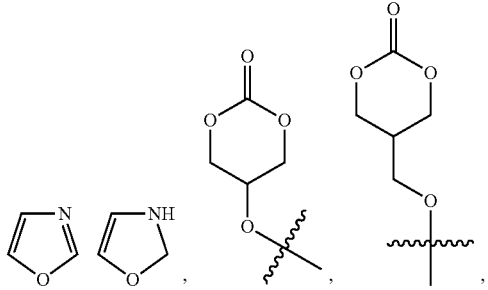

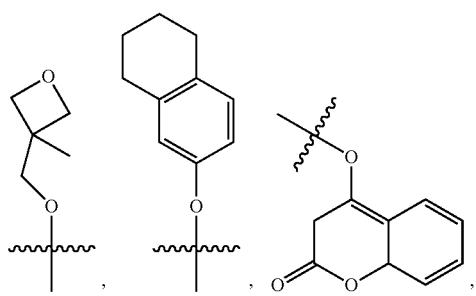

-continued

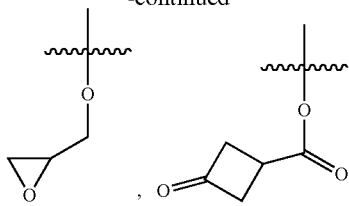

$A_1$ and $A_2$ are not simultaneously —H, and, n is an integer selected from 1 to 12.

The compound represented by Chemical Formula 1 may be a compound represented by Chemical Formula 1-2:

[Chemical Formula 1-2]

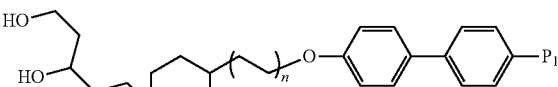

In Chemical Formula 1-2: $P_1$ is selected from

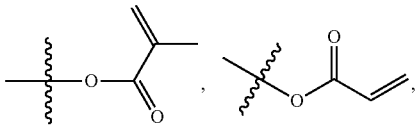

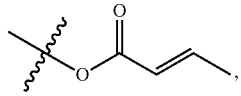

and n is an integer selected from 1 to 12.

The compound represented by Chemical Formula 1 may be a compound represented by Chemical Formula 1-3:

[Chemical Formula 1-3]

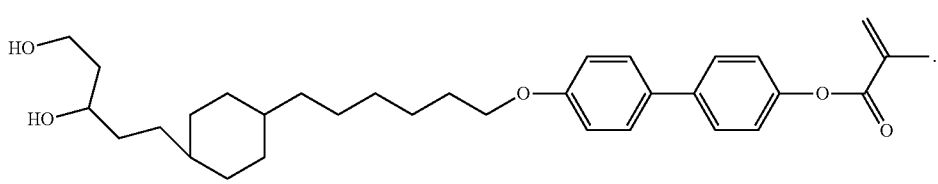

The protrusion may include a polymer including a compound represented by Chemical Formula 2.

The compound represented by Chemical Formula 2 may be a compound represented by Chemical Formula 2-1:

[Chemical Formula 2-1]

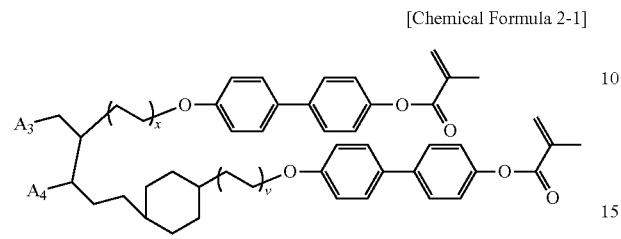

In Chemical Formula 2-1: $A_3$ and $A_4$ are each selected from —H, —OH,

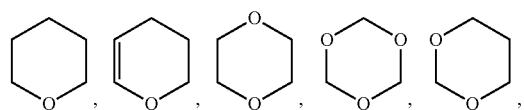

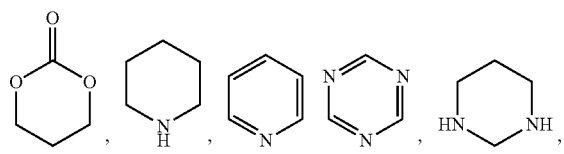

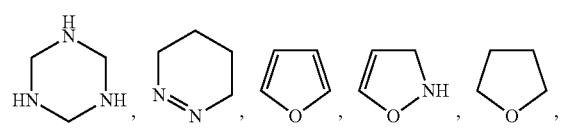

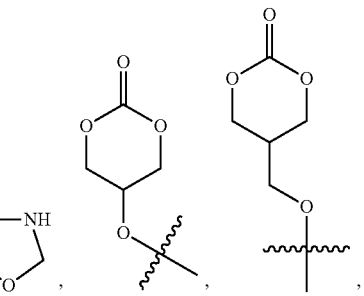

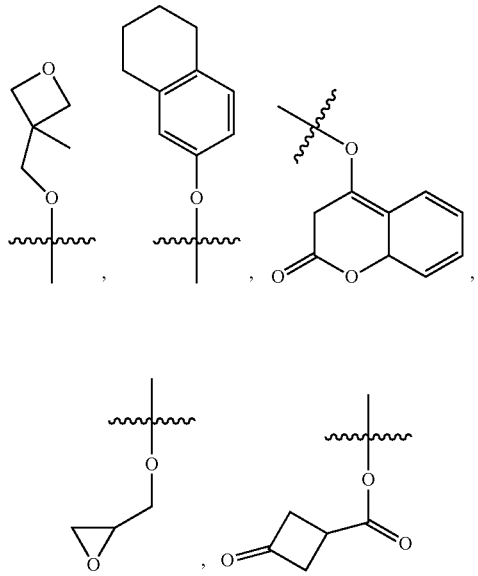

$A_3$ and $A_4$ are not simultaneously —H, x and y are each an integer selected from 1 to 12, and x is an integer lower than y.

The compound represented by Chemical Formula 2 may be a compound represented by Chemical Formula 2-2:

[Chemical Formula 2-2]

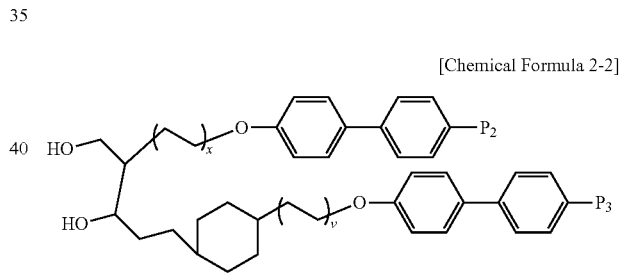

In Chemical Formula 2-2: $P_2$ and $P_3$ are each selected from

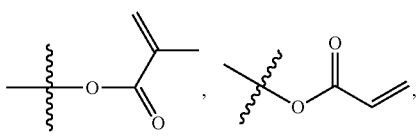

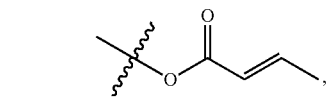

and.

x and y are each an integer selected from 1 to 12, and x is an integer lower than y.

The compound represented by Chemical Formula 2 may be a compound represented by Chemical Formula 2-3:
[Chemical Formula 2-3]

[Chemical Formula 2-3]

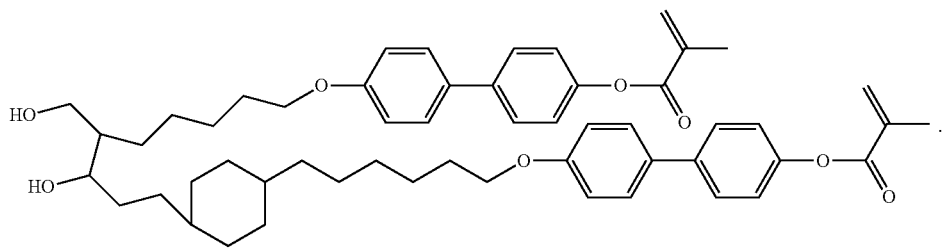

The sealant may be disposed in the non-display area. The first light blocking member may be disposed between the sealant and the display area.

The first display panel may include a first substrate and a first electrode that is disposed on a side of the first substrate. The second display panel may include a second substrate and a second electrode that is disposed on a side of the second substrate. The protrusions may be disposed adjacent to each of the first electrode and the second electrode.

The first electrode may include a first subpixel electrode and a second subpixel electrode that are disposed apart from each other.

The first display panel may include second light blocking members that are disposed between the first subpixel electrode and the second subpixel electrode.

The second light blocking members may include red color filters and blue color filters that are disposed on the red color filters.

The first display panel may include a first substrate, a first electrode, and a first alignment layer. The first electrode and the first alignment layers may be sequentially stacked on a side of the first substrate. The second display panel may include a second substrate and a second electrode that is disposed on a side of the second substrate. The protrusions may be adjacent to the second electrode.

The first display panel may include a first substrate and a first electrode that is disposed on a side of the first substrate. The second display panel may include a second substrate, a second electrode, and a second alignment layer. The second electrode and the second alignment layer may be sequentially stacked on a side of the second substrate. The protrusions may be adjacent to the first electrode.

According to an exemplary embodiment of the present invention, a liquid crystal display is provided in which a leakage of light in a non-display area of the liquid crystal display may be reduced or eliminated.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF THE EMBODIMENTS

Figure 1:
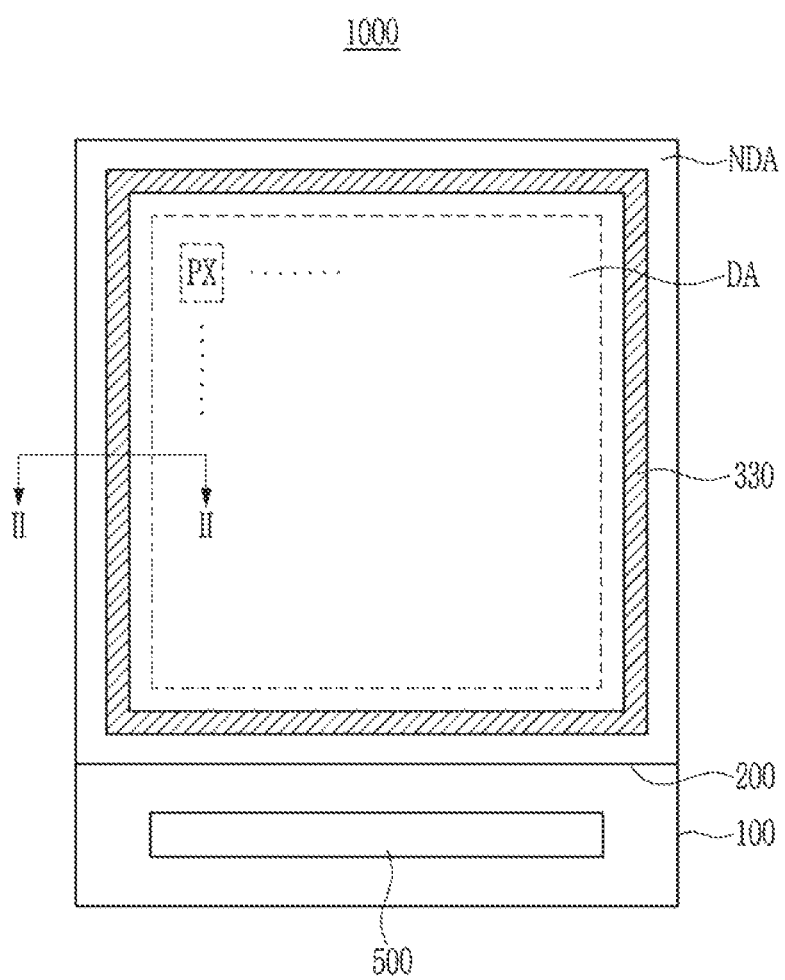
FIG. 1 is a plan view of a liquid crystal display according to an exemplary embodiment of the present invention.
Figure 2:
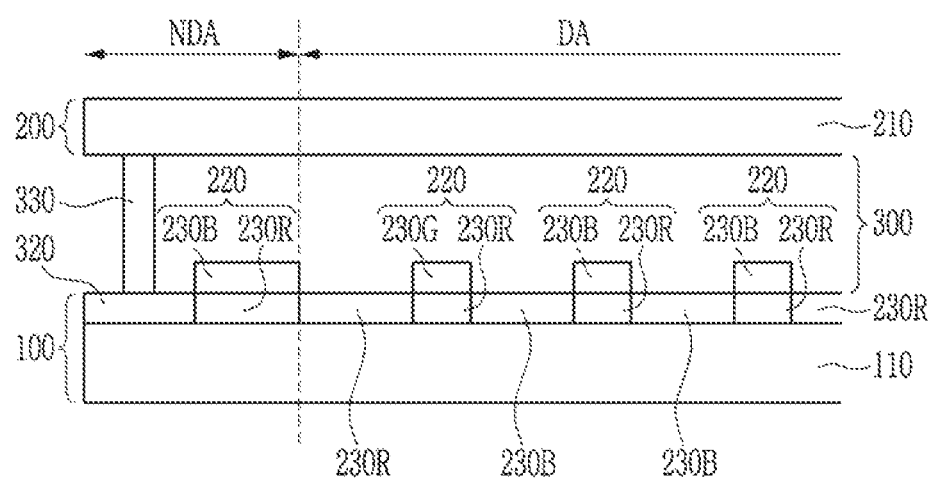
FIG. 2 is a cross-sectional view of the liquid crystal display of FIG. 1, taken along the line II-II.

Exemplary embodiments of the present invention will be described below in more detail with reference to the accompanying drawings. In this regard, the exemplary, embodiments may have different forms and should not be construed as being limited to the exemplary embodiments of the present invention described herein Like reference numerals may refer to like elements throughout the specification and drawing Sizes of elements in the drawings may be exaggerated for clarity of description It will be understood that when a component, such as a layer, a film, a region, or a plate, is referred to as being "on" another component, the component may be directly on the other component or intervening components may be present Throughout the specification, the phrase "on a plane" or "in a plan view" may refer to viewing the object portion from the top, and the phrase "on a cross-section" or "a cross-sectional view) may refer to viewing a cross-section of which the object portion is vertically cut from the side. FIG. 1 is a plan view of a liquid crystal display according to an exemplary embodiment of the present invention. FIG. 2 is a cross-sectional view of the liquid crystal display of FIG. 1, taken along the line FIG. 2 schematically illustrates, for example, a structure of a color filter and a light blocking member.

Referring to FIG. 1 and FIG. 2, a liquid crystal display 1000 according an exemplary embodiment of the present invention may include a display area DA where an image may be displayed and a non-display area NDA that is disposed outside the display area DA. For example, the non-display area NDA may be adjacent to the display area DA. As an example, the non-display area NDA may be arranged at four sides of the display area DA in a plan view; however, exemplary embodiments of the present invention are not limited thereto. For example, the non-display area NDA may be arranged at less than four sides (e.g., at three sides) of the display area DA in a plan view. A plurality of pixels PX may be disposed in the display area DA. As an example, the pixels PX may be spaced apart from each other. For example, the pixels PX may be arranged in a plurality of rows and columns to have a matrix configuration.

The liquid crystal display 1000 according to an exemplary embodiment of the present invention may include a first display panel 100 and a second display panel 200 that face each other, and a liquid crystal layer 300 that is disposed between the first display panel 100 and the second display panel 200. A sealant 330 may be positioned between the first display panel 100 and the second display panel 200. The first display panel 100 and the second display panel 200 may be bonded to each other by a sealant 330. As an example, the sealing 330 may be in direct contact with a surface of the first display panel 100 facing the second display panel 200 and may be in direct contact with a surface of the second display panel 200 facing the first display panel 100. The sealant 330 may be disposed in the non-display area NDA.

The liquid crystal display 1000 according to an exemplary embodiment of the present invention may include a driver 500 that receives an external driving signal and transmits the received driving signal to the display area DA. The driver 500 may be disposed in the first display panel 100, in the non-display area NDA. Alternatively, the driver 500 may be disposed in the second display panel 200, in the non-display area NDA.

Referring to FIG. 2, some of constituent elements of the display area DA may be omitted, and a structure of a color filter and a light blocking member, for example, are schematically illustrated.

The first display panel 100 may include a first substrate 110, red color filters 230R, green color filters 230G, blue color filters 230B, light blocking members 220, and a step member 320.

The second display panel 200 may include a second substrate 210.

The plurality of pixels PX disposed in the display area DA may include pixels displaying a red color, pixels displaying a green color, and pixels displaying a blue color. The pixels displaying red, the pixels displaying green, and the pixels displaying blue respectively include the red color filters 230R, the green color filters 230G, and the blue color filters 230B. For example, the red color filter 230R, the green color filter 230G, and the blue color filter 230B may be in a pixel displaying red, a pixel displaying green, and a pixel displaying blue, respectively.

Light blocking members 220 may be disposed between the respective pixels PX. Each light blocking member 220 may include a red color filter 230R, and a blue color filter 230b disposed on the red color filter 230R. As an example, the red color filter 230R may be disposed on the first substrate 110. A structure in which the red color filter 230R and the blue color filter 230B are sequentially stacked can increase a light blocking effect. In an exemplary embodiment of the present invention, the red color filter 230R is stacked on the blue color filter 230B in the stacking structure of the light blocking member 220, but this is not restrictive. The red color filter 230R may be disposed on the blue color filter 230B. Thus, the blue color filter 230B may be disposed on the first substrate 110. Alternatively, either the red color filter 230R or the blue color filter 230B may be disposed on the second substrate 210.

The light blocking member 220 may also disposed in the non-display area NDA.

The sealant 330 that bonds the first display panel 100 and the second display panel 200 to each other may be disposed in the non-display area NDA. The light blocking members 220 disposed in the non-display area NDA may be disposed between the sealant 330 and the display area DA. The step member 320 may be disposed between the sealant 330 and the first substrate 110.

Figure 3:
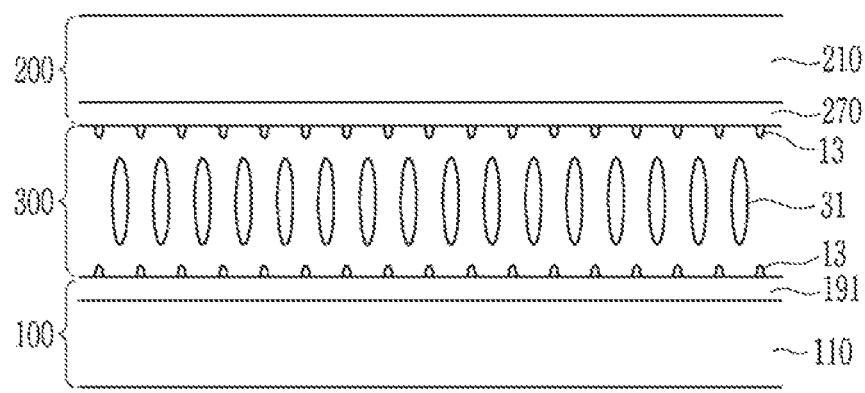
FIG. 3 is a cross-sectional view of the liquid crystal display of FIG. 1.

FIG. 3 is a cross-sectional view of the liquid crystal display of FIG. 1.

Referring to FIG. 3, the first display panel 100 may include the first substrate 110 and a first electrode 191 may be disposed on a side of the first substrate 110. The red color filters 230R, the green color filters 230G, the blue color filters 230B, and the light blocking members 220 (see, e.g., FIG. 2) may be disposed between the first electrode 191 and the first substrate 110. The second display panel 200 may include the second substrate 210 and a second electrode 270 that is disposed on a side of the second substrate 210. The liquid crystal layer 300 may include a plurality of liquid crystal molecules 31 and a plurality of protrusions 13. The protrusions 13 may be disposed adjacent to the first electrode 191 and the second electrode 270. For example, the protrusions 13 may be in direct contact with the first electrode 191 and the second electrode 270. The protrusions 13 may project into the liquid crystal layer 300.

The protrusions 13 may include a polymer including a compound represented by Chemical Formula 1.

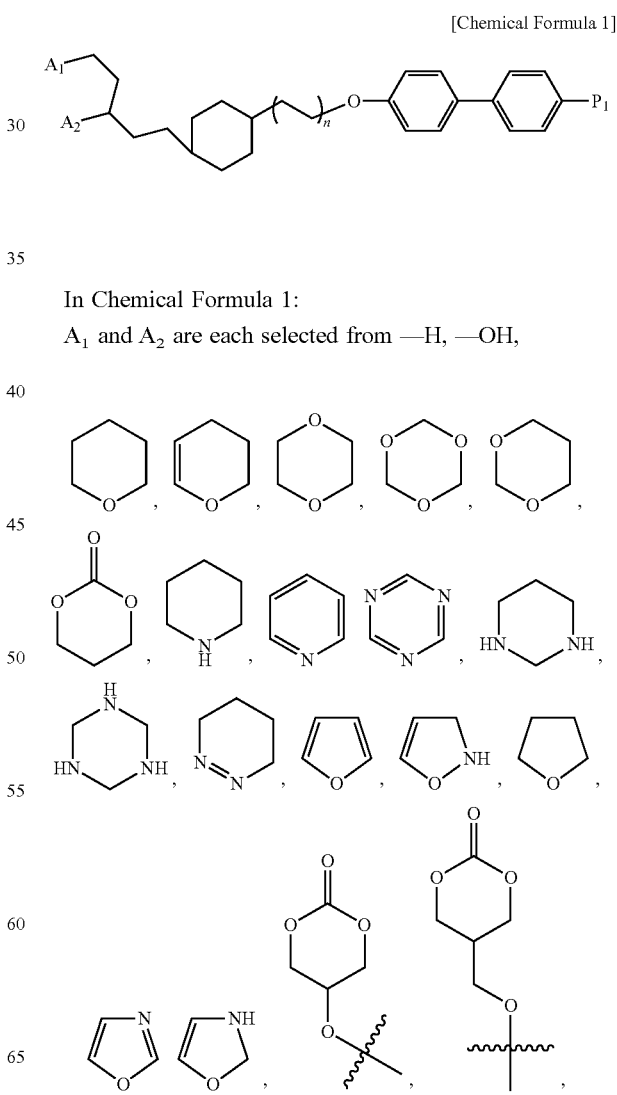

[Chemical Formula 1]

In Chemical Formula 1:

$A_1$ and $A_2$ are each selected from —H, —OH,

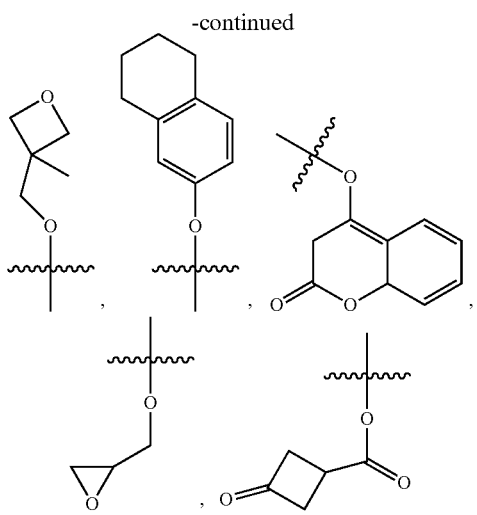

$A_1$ and $A_2$ are not simultaneously —H. That is, a configuration in which $A_1$ is —H and at the same time $A_2$ is —H is excluded.

In $A_1$ and $A_2$, a portion represented by

indicates a portion bonded to Chemical Formula 1. However, in $A_1$ and $A_2$, a chemical formula having no additional expression of

indicates that any portion that can be bonded to Chemical Formula 1 among the chemical formulas can be bonded to Chemical Formula 1 without any restriction. This is also equally applied to other portions in the present disclosure.

$P_1$ is one selected from

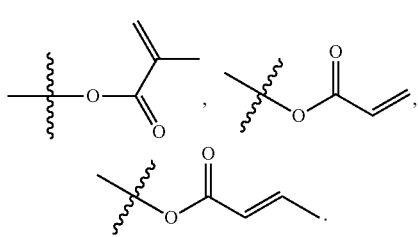

In $P_1$, a portion expressed by

indicates a portion combined to (e.g., chemically bonded to) the above-stated chemical formula. Additionally,

as used herein, indicates a portion chemically bonded to a described chemical formula.

In addition, n is an integer selected from 1 to 12.

In the compound represented by Chemical Formula 1, $A_1$ and $A_2$ connect a compound represented by Chemical Formula 1 and an electrode while being chemically combined with a material included in the first electrode 191 or the second electrode 270. For example, the first electrode 191 and the second electrode 270 may be respectively chemically combined with $A_1$ and $A_2$.

Chemical structural formulas included in $A_1$ and $A_2$ include an oxygen atom, a nitrogen atom, or a hydrogen atom, and the oxygen atom, the nitrogen atom, and the hydrogen atom are hydrogen-combined with oxygen and hydrogen atoms included in the first electrode 191. This is also equally applied to the second electrode 270.

In the compound represented by Chemical Formula 1, $P_1$ is a photo-reactive functional group that may experience a polymerization reaction during light irradiation. Methacrylate and the like included in $P_1$ forms a polymer by photo-polymerizing neighboring $P_1$ during the light irradiation, and the protrusions 13 (see, e.g., FIG. 3) may be formed by the photo-polymerization.

When the protrusion 13 including a polymer is a compound represented by Chemical Formula 1, the liquid crystal layer 300 may include a reactive mesogen. The liquid molecules 31 are vertically aligned by the compound represented by Chemical Formula 1, and they may be pre-tilted by polymerization of the protrusions 13 and the reactive mesogen.

However, this is not restrictive, and the protrusion 13 may include a polymer including a compound represented by Chemical Formula 2.

[Chemical Formula 2]

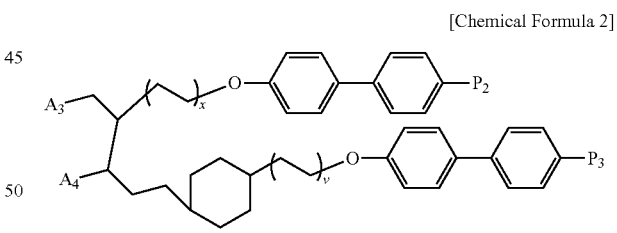

In Chemical Formula 2:

$A_3$ and $A_4$ are each selected from —H, —OH,

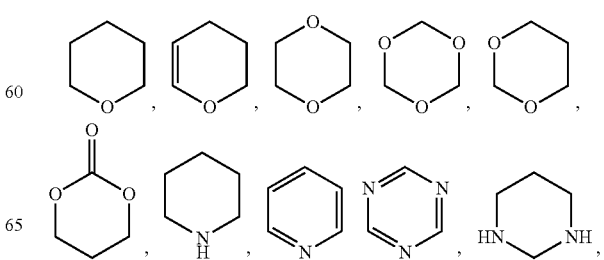

-continued

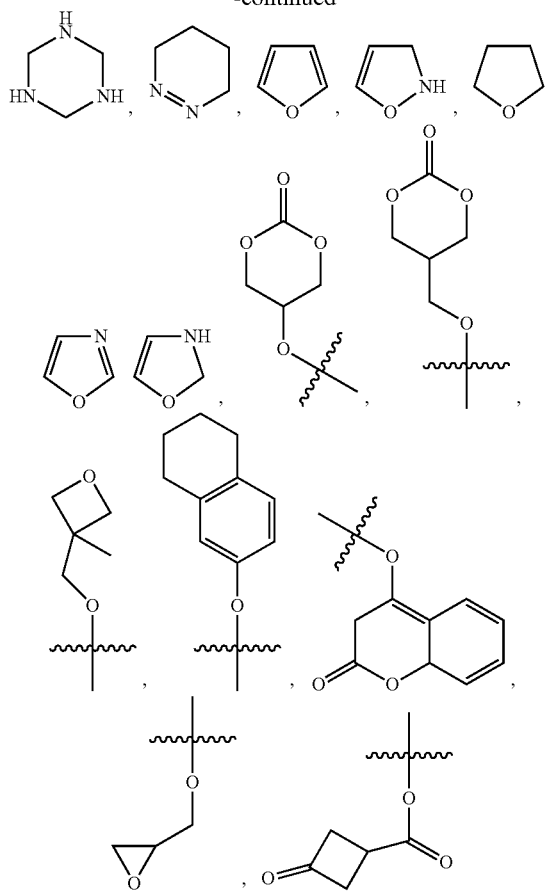

$A_3$ and $A_4$ are not simultaneously —H. That is, a configuration in which $A_3$ is —H and at the same time $A_4$ is —H is excluded.

In $A_3$ and $A_{-4}$, a portion represented by

indicates a portion bonded to Chemical Formula 2. However, in $A_3$ and $A_4$, a chemical formula having no additional expression of

indicates that any portion that can be bonded to Chemical Formula 2 among the chemical formulas can be bonded to Chemical Formula 2 without any restriction. Additionally,

as used herein, indicates a portion chemically bonded to a described chemical formula.

$P_2$ and $P_3$ are each selected from

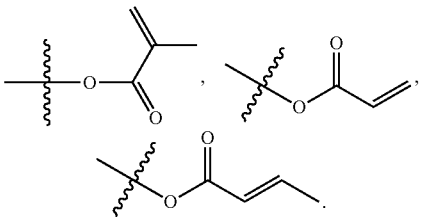

In $P_2$ and $P_3$, a portion represented by

indicates a portion bonded to Chemical Formula 2. Additionally,

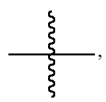

as used herein, indicates a portion chemically bonded to a described chemical formula.

In addition, x and y are each an integer selected from 1 to 12, and x is an integer lower than y.

In the compounds represented by Chemical Formula 2, $A_3$ and $A_4$ may connect the compound represented by Chemical Formula 2 with the first electrode 191 or the second electrode 270 while being chemically bonded with a material included in the first electrode 191 or the second electrode 270. For example, the first electrode 191 and the second electrode 270 may be respectively chemically bonded with $A_3$ and $A_4$.

Chemical structural formulas included in $A_3$ and $A_4$ include an oxygen atom, a nitrogen atom, or a hydrogen atom, and the oxygen, nitrogen, and hydrogen atoms are hydrogen-bonded with oxygen and hydrogen atoms included in the first electrode 191. This can also be equally applied to the second electrode 270.

In the compounds represented by Chemical Formula 2, $P_2$ and $P_3$ are photo-reactive functional groups that may experience a polymerization reaction during light irradiation. Methacrylate or the like included in $P_2$ and $P_3$ may form a polymer by photo-polymerizing neighboring $P_2$ or $P_3$ during the light irradiation, and the protrusions 13 (see, e.g., FIG. 3) may be formed by the photo-polymerization.

The compound represented by Chemical Formula 2 has a structure in which $P_2$ and $P_3$, photo-reactive functional groups, are included and, thus two photo-reactive functional groups are included in one compound. Here, carbon chains to which $P_2$ and $P_3$ are respectively connected may have different lengths. That is, since x is an integer lower than y in Chemical Formula 2, the length of the carbon chain to which $P_2$ is connected is shorter. In a case of having such a structure, the photo-reactive functional groups can be reacted in various portions, and thus photo-polymerization can be more robust. Accordingly, a portion where the photo-polymerization occurs is substantially expanded to one edge P$_3$ and a middle area P$_2$ in Chemical Formula 2, and thus a polymer can be more robustly formed by the photo-polymerization.

When the protrusion 13 include a polymer including the compound represented by Chemical Formula 2, an additional alignment layer or reactive mesogen may be omitted. The liquid crystal molecules 31 are vertically aligned by the compound represented by Chemical Formula 2, and they may be pre-tilted by the protrusions 13. Thus, a manufacturing cost of a display device according to an exemplary embodiment of the present invention may be reduced.

A polymer including compounds represented by Chemical Formula 1 or a polymer including compounds represented by Chemical Formula 2 have a structure that can introduce vertical alignment of the liquid crystal molecules, and the protrusions 13 include the polymer of the compound s presented by Chemical Formula 1 or a polymer including compounds represented by Chemical Formula 2, and accordingly, the liquid crystal molecules 31 can be vertically aligned without an alignment layer, and they may be pre-tilted.

In addition, the protrusions 13 may be also disposed between the sealant 330 of the non-display area NDA, and the display area DA. Thus, the liquid crystal molecules 31 disposed between the sealant 330 and the display area DA can be vertically aligned without having an alignment layer, thus preventing an occurrence of light leakage in a portion between the sealant 330 and the display area DA.

The compound represented by Chemical Formula 1 may be a compound represented by Chemical Formula 1-1.

-continued

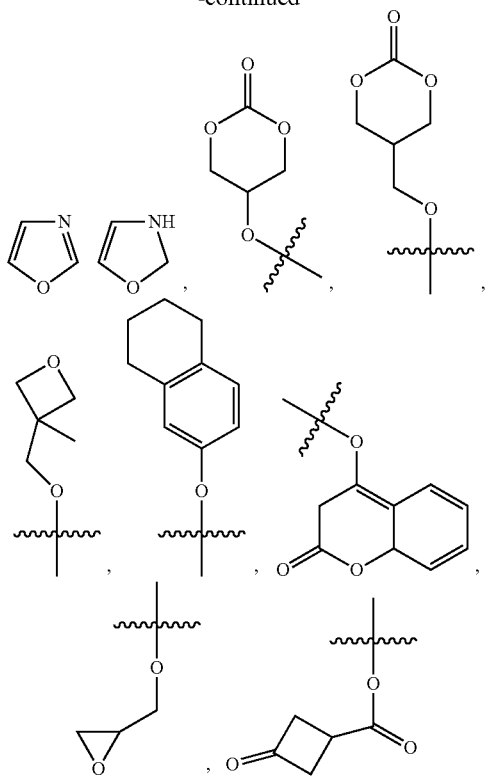

[Chemical Formula 1-1]

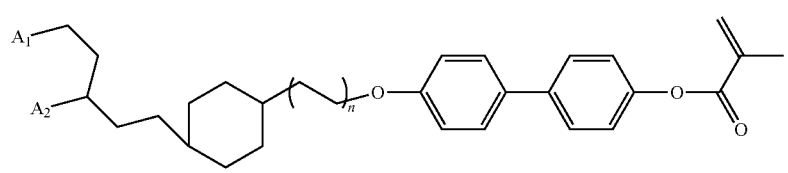

In Chemical Formula 1-1:

A$_1$ and A$_2$ are each selected from —H, —OH,

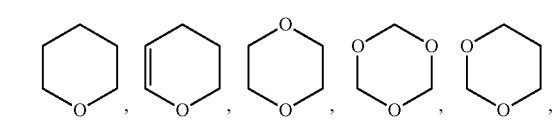

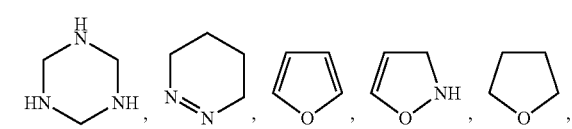

A$_1$ and A$_2$ are not simultaneously —H.

Further, n is an integer selected from 1 to 12.

Alternatively, the compound represented by Chemical Formula 1 may be a compound represented by Chemical Formula 1-2.

[Chemical Formula 1-2]

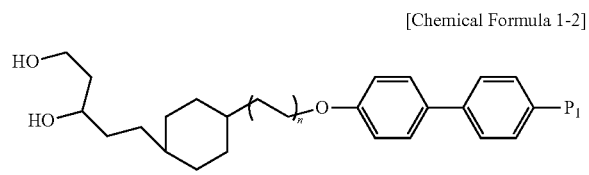

In Chemical Formula 1-2:

P$_1$ is selected from

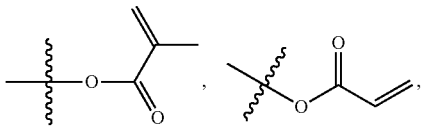

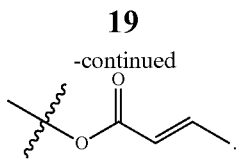

Further, n is an integer selected from 1 to 12.

Alternatively, the compound represented by Chemical Formula 1 may be a compound represented by Chemical Formula 1-3.

[Chemical Formula 1-3]

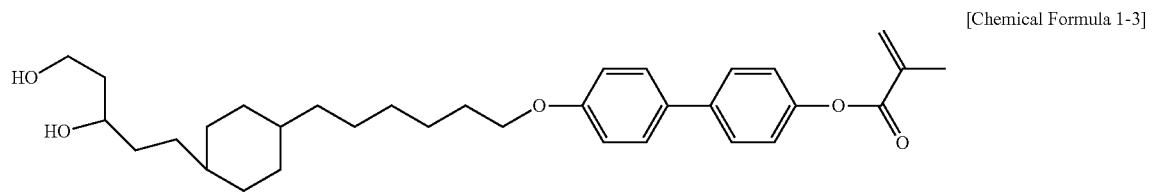 [SMILES: C=C(C)C(=O)Oc1ccc(-c2ccc(OCCCCCCC3CCC(CCC(O)CCO)CC3)cc2)cc1]

The compound represented by Chemical Formula 1-3 may be prepared by the following reaction equation. However, this is exemplarily provided, and the present invention is not limited thereto.

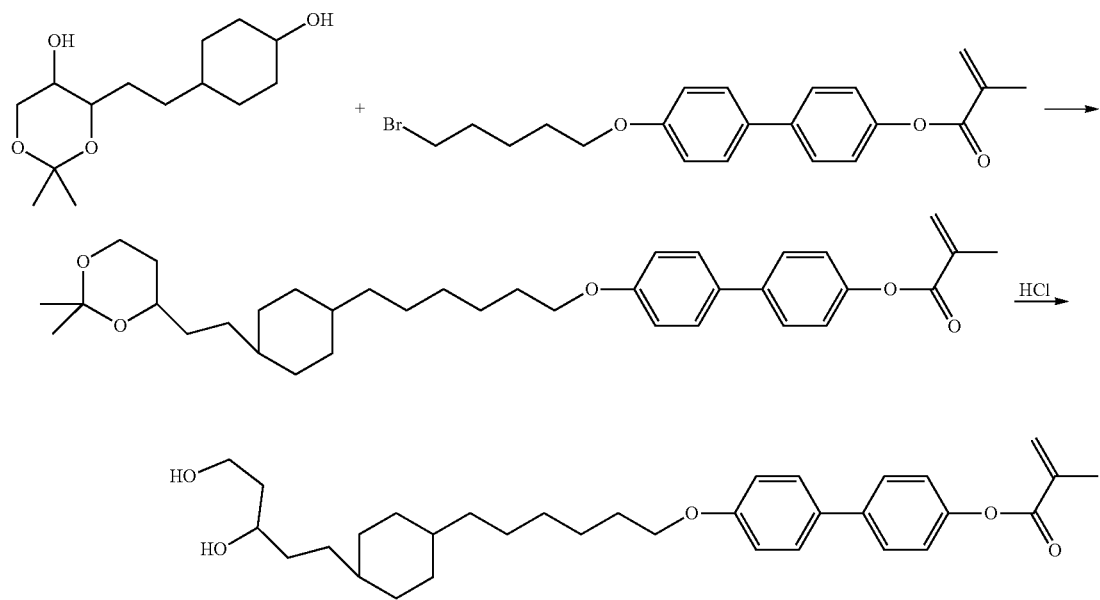

The compound represented by Chemical Formula 2 may be a compound represented by Chemical Formula 2-1.

[Chemical Formula 2-1]

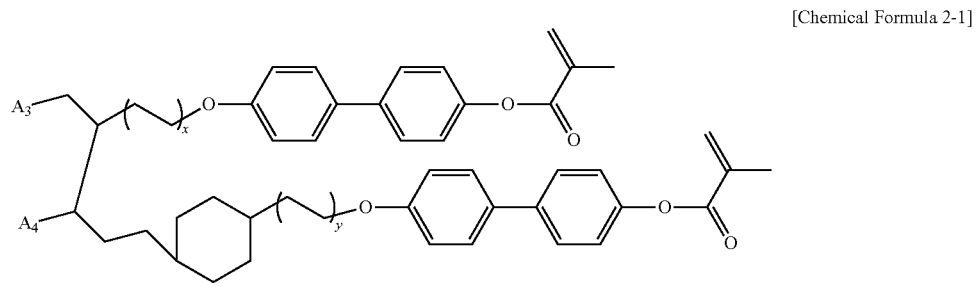

In Chemical Formula 2-1:
$A_3$ and $A_4$ are each selected from —H, –OH,

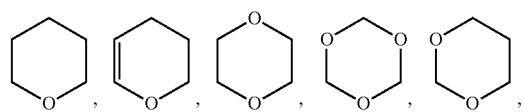

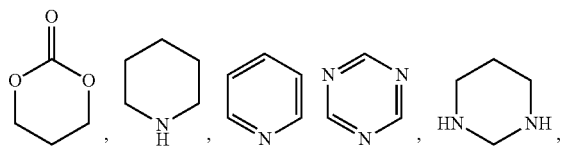

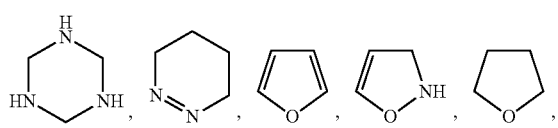

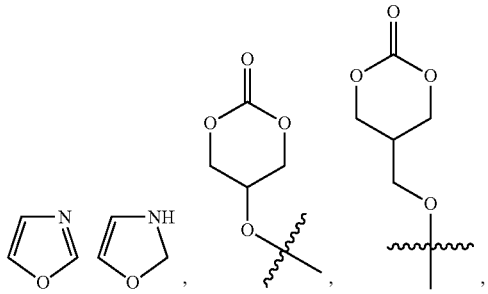

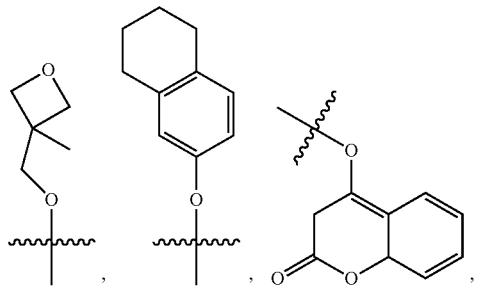

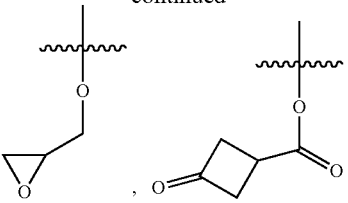

$A_3$ and $A_4$ are not simultaneously —H.

x and y are each an integer selected from 1 to 12, and x is an integer lower than y.

Alternatively, the compound represented by Chemical Formula 2 may be a compound represented by Chemical Formula 2-2.

[Chemical Formula 2-2]

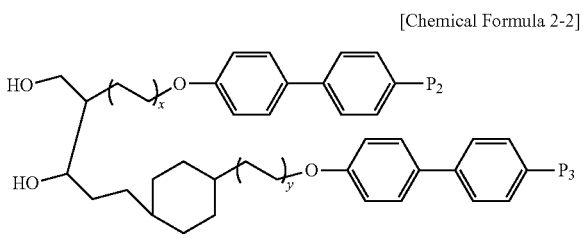

In Chemical Formula 2-2:
$P_2$ and $P_3$ are each selected from

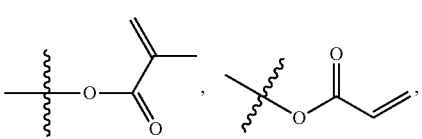

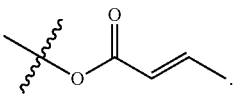

Further, x and y are each an integer selected from 1 to 12, and x is an integer lower than y.

Alternatively, the compound represented by Chemical Formula 2 may be a compound represented by Chemical Formula 2-3.

[Chemical Formula 2-3]

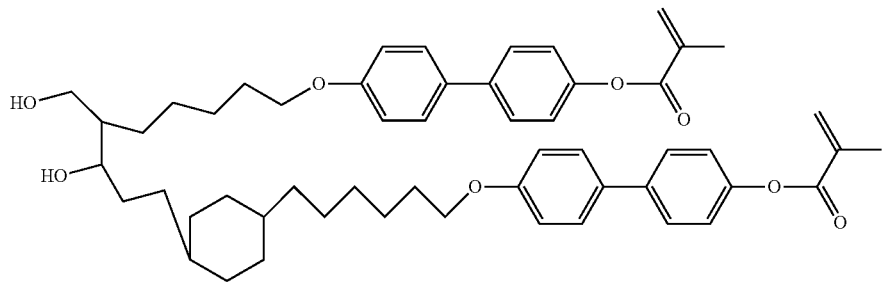

The compound represented by Chemical Formula 2-3 may be prepared by the following reaction equation. However, this is exemplarily provided, and the present invention is not limited thereto.

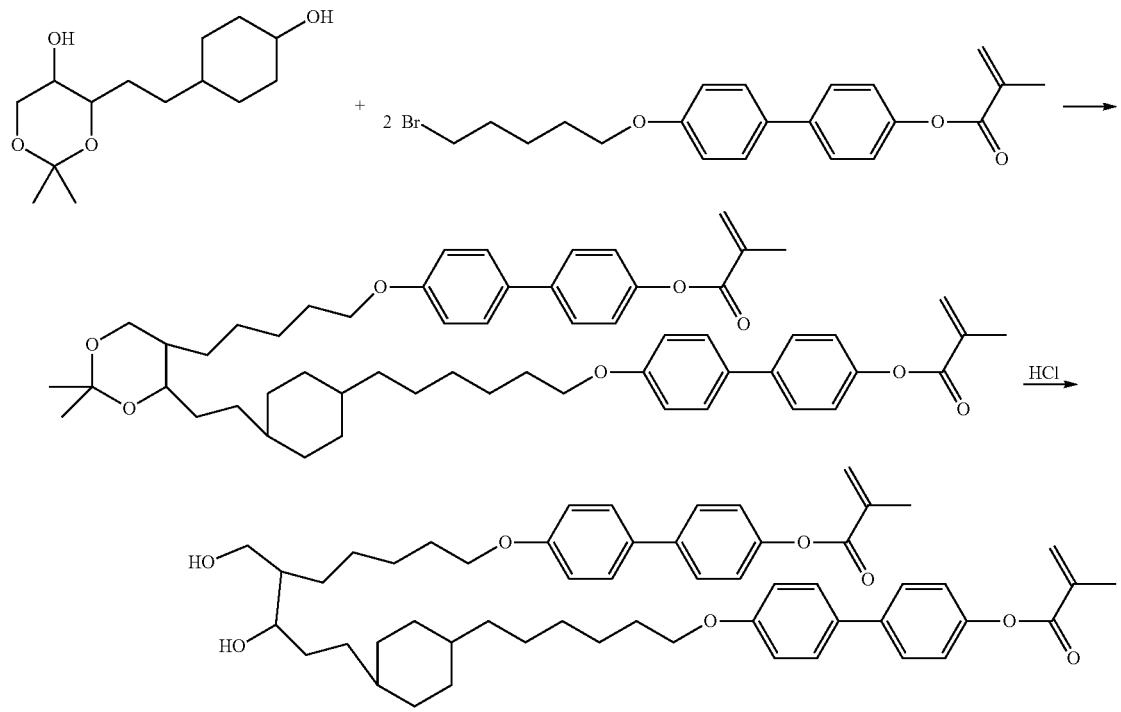

Figure 4:
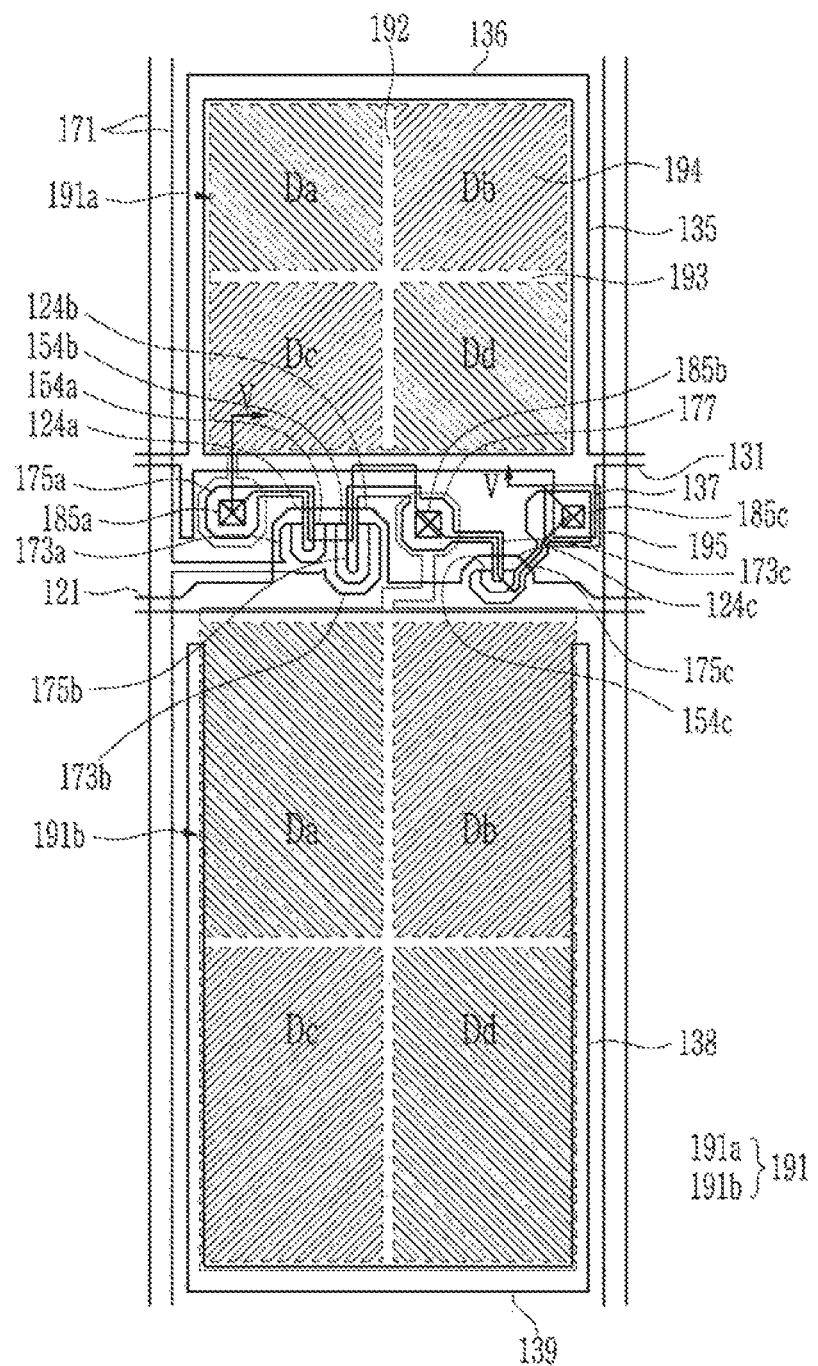
FIG. 4 is a plan view of a pixel of a liquid crystal display according to an exemplary embodiment of the present invention.
Figure 5:
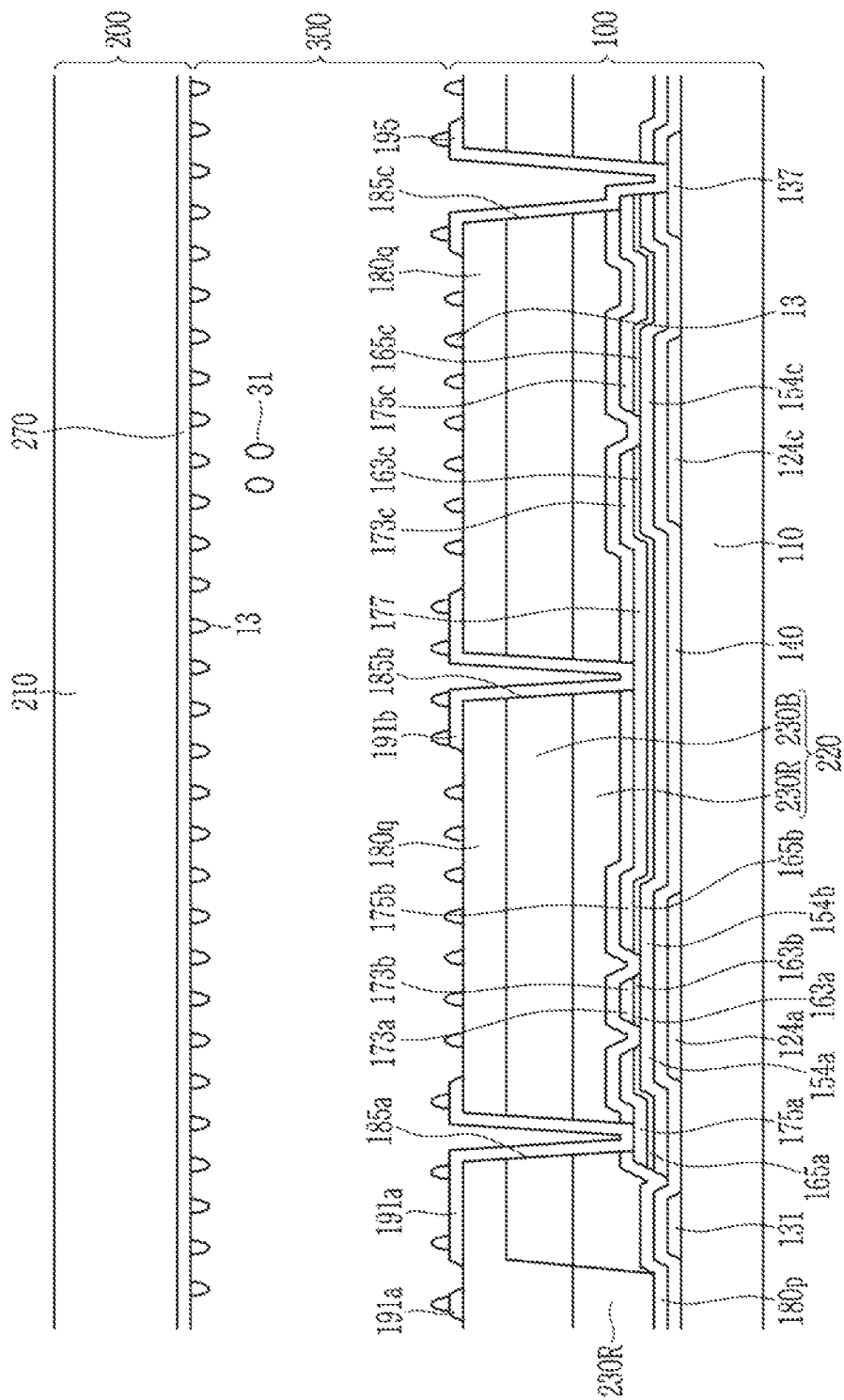
FIG. 5 is a cross-sectional view of the pixel of FIG. 4, taken along the line V-V.

Referring to FIG. 4 and FIG. 5, a structure of the liquid crystal display according to an exemplary embodiment of the present invention to which the above-described light blocking members and protrusions are applied will be described in more detail below. However, the structure of the liquid crystal display described herein is an exemplary, structure, and the present invention is not limited to a particular structure, such as a particular pixel structure described herein.

FIG. 4 is a plan view of a pixel of a liquid crystal display according to an exemplary embodiment of the present invention. FIG. 5 is a cross-sectional view of the pixel of FIG. 4, taken along the line V-V.

Referring to FIG. 4 and FIG. 5, the liquid crystal display 1000 according to an exemplary embodiment of the present invention may include the first display panel 100 and the second display panel 200 that face each other, and the liquid crystal layer 300 disposed between the first display panel 100 and the second display panel 200.

A gate conductor including a gate line 121 and a partial pressure reference line 131 may be disposed on the first substrate 110. The first substrate 110 may include transparent glass or plastic. A voltage may be applied to the partial pressure reference line 131, thus the partial pressure reference line 131 may be interchangeably referred to as a partial pressure reference voltage line.

The gate line 121 may include a first gate electrode 124a, a second gate electrode 124b, and a third gate electrode 124c.

The partial pressure reference line 131 may include first sustain electrodes 135 and 136 and a reference electrode 137. Second sustain electrodes 138 and 139 may be disposed to be overlapped with a second sub-pixel electrode 191b. Second sustain electrodes 138 and 139 might not be connected to the partial pressure reference voltage line 131.

A gate insulation layer 140 may be disposed on the gate line 121 and the partial pressure reference line 131.

A first semiconductor layer 154a, a second semiconductor layer 154b, and a third semiconductor layer 154c may be disposed on the gate insulating layer 140. Ohmic contacts 163a, 165a, 163b, 165b, 163c, and 165c may be disposed on the semiconductor layers 154a, 154b, and 154c.

A data conductor that includes a data line 171 connected to a first source electrode 173a and a second source electrode 173b, a first drain electrode 175a, a second drain electrode 175h, a third source electrode 173c, and a third drain electrode 175c may be disposed on the ohmic contacts 163a, 165a, 163b, 165b, 163c, and 165c and the gate insulation layer 140.

The first gate electrode 124a, the first source electrode 173a, and the first drain electrode 175a may form a first transistor together with the first semiconductor layer 154a, the second gate electrode 124h, the second source electrode 173b. The second drain electrode 175b may form a second transistor together with the second semiconductor layer 154b. The third gate electrode 124c, the third source electrode 173c, and the third drain electrode 175c may form a third transistor together with the third semiconductor layer 154c.

The second drain electrode 175b may be connected with the third source electrode 173c, and may include a wide expansion portion 177.

A first passivation layer 180p may be disposed on the data conductors 171, 173c, 175a, 175b, and 175c and the semiconductor layers 154a, 154b, and 154c. The first passivation layer 180p may include an inorganic insulation material.

Red color filters 230R and light blocking members 220 may be disposed on the first passivation layer 180p. The light blocking members 220 may include red color filters 230R, and blue color filters 230B that are disposed on the red color filters 230R. A pixel may include the red color filters 230R and thus may be a pixel that displays a red color, but this is not restrictive. The color filter may be a green color filter 230G or a blue color filter 230B, for example.

A second passivation layer 180q may be disposed on the red color filter 230R and the light blocking member 220. The second passivation layer 180q may remove a step difference between the red color filters 230R and the light blocking members 220, and may include an organic insulation material. In addition, the second passivation layer 180q may prevent the red color filter 230R and the light blocking member 220 from being lifted, and may prevent a defect such as an afterimage that may occur when driving the screen by suppressing contamination of the liquid crystal layer 300 due to an organic material such as a solvent flowing from the red color filter 230R and the light blocking member 220.

The first passivation layer 180p, the light blocking member 220, and the second passivation layer 180q may have a first contact hole 185a and a second contact hole 185b that respectively overlap the first drain electrode 175a and the second drain electrode 175b. The first contact hole 185a and the second contact hole 185b may penetrate the first passivation layer 180p, the light blocking member 220, and the second passivation layer 180q.

In addition, the first passivation layer 180p, the light blocking member 220, the second passivation layer 180q, and the gate insulating layer 140 may include a third contact hole 185c that overlaps a part of the reference electrode 137 and a part of the third drain electrode 175c. The third contact hole 185c may be covered by a connection member 195. The connection member 195 may electrically connect the reference electrode 137 that overlaps the third contact hole 185c with the third drain electrode 175c. The third contact hole 185c may penetrate the first passivation layer 180p, the light blocking member 220, the second passivation layer 180q, and the gate insulating layer 140.

The first electrode 191 may be disposed on the second passivation layer 180q. As one of field generation electrodes, the first electrode 191 may be a pixel electrode. Thus, the first electrode 191 may be interchangeably referred to as a pixel electrode. The first electrode 191 may include a first subpixel electrode 191a and the second subpixel electrode 191b that are separated from each other. The gate line 121 may be disposed between the first subpixel electrode 191a and the second subpixel electrode 191b. The first subpixel electrode 191a and the second subpixel electrode 191b may be adjacent to each other with reference to the gate line 121 (e.g., when viewed in a plan view).

The light blocking member 220 may be disposed between the first subpixel electrode 191a and the second subpixel electrode 191b. In addition, the light blocking member 220 may overlap the data line 171. For example, the light blocking member 220 may be disposed between adjacent pixels (e.g., pixels PX).

The first electrode 191 may include a transparent material such as ITO and IZO.

An overall shape of the first subpixel electrode 191a and the second subpixel electrode 191b is a rectangle, and each of the first and second subpixel electrodes 191a and 191b may include a cross-shaped stem portion including a horizontal stem portion 193 and a vertical stem portion 192 that perpendicularly crosses the horizontal stem portion 193; however, exemplary embodiments of the present invention are not limited thereto and a shape of the first subpixel electrode 191a and the second subpixel electrode 191b may be a shape other than a rectangle (e.g., a square). In addition, each of the first subpixel electrode 191a and the second subpixel electrode 191b may be divided into a first subarea Da, a second subarea Db, a third subarea Dc, and a fourth subarea Dd by the horizontal stem portion 193 and the vertical stem portion 192, and may include a plurality of minute branch portions 194 disposed in each of the first to fourth subareas Da to Dd.

The first subpixel electrode 191a and the second subpixel electrode 191b may be connected with the first drain electrode 175a or the second drain electrode 175b through the first contact hole 185a or the second contact hole 185b, and may receive a data voltage from the first drain electrode 175a and the second drain electrode 175b. In this case, some of the data voltage applied to the second drain electrode 175b may be divided through the third source electrode 173c, and the voltage supplied to the first subpixel electrode 191a may become higher than the voltage supplied to the second subpixel electrode 191b.

The first subpixel electrode 191a and the second subpixel electrode 191b, which are supplied with the data voltage, may generate an electric field together with the second electrode 270 of the second display panel 200 such that a direction of liquid crystal molecules 31 of the liquid crystal layer 300 between the two electrodes 191 and 270 is determined. Luminance of light passing through the liquid crystal layer 300 is changed depending on the direction of the liquid crystal molecules 31, which may be determined as described above.

The description of the thin film transistor and the pixel electrode 191 described above is just exemplary, and a structure of the thin film transistor and a design of the pixel electrode may be modified, such as, to increase side visibility.

The second display panel 200 will be described in more detail below.

The second substrate 210 may be disposed to be overlapped with the first substrate 110 while being disposed spaced apart from the first substrate 110. The second electrode 270 may be disposed on a side of the second substrate 210. The second electrode 270 may face the first electrode 191. The second electrode 270 may generate an electric field with the first electrode 191 of the first display panel 100, and thus a direction of the liquid crystal molecules 31 of the liquid crystal layer 300 may be determined. The second electrode 270 may be a common electrode.

The liquid crystal layer 300 may include liquid crystal molecules 31 and protrusions 13. The protrusions 13 may be disposed adjacent to the first electrode 191 and the second electrode 270. The protrusions 13 may include a polymer including a compound represented by Chemical Formula 1 or a compound represented by Chemical Formula 2. When the protrusion 13 includes a polymer including the compound represented by Chemical Formula 1, a reactive mesogen may be further included in the liquid crystal layer 300.

The liquid crystal layer 300 may further include a compound represented by Chemical Formula 1, which is in a non-reactive state, or a compound represented by Chemical Formula 2. In the manufacturing process of the liquid crystal display according to an exemplary embodiment of the present invention, the compound represented by Chemical Formula 1 or the compound represented by Chemical Formula 2 may be included in the liquid crystal layer 300 and may be used to form protrusions 13. For example, the protrusions 13 may be formed by using the compound represented by Chemical Formula 1 or the compound represented by Chemical Formula 2 already included in the liquid crystal layer 300 by an in situ process. For example, some of the compound represented by Chemical Formula 1 or some of the compound represented by Chemical Formula 2 might not react and thus may remain in the liquid crystal layer 300.

In an exemplary embodiment of the present invention, the protrusions 13 may be disposed adjacent to the first electrode 191 and the second electrode 270, but this is not restrictive. The protrusions 13 might be disposed adjacent to only one of the first electrode 191 or the second electrode 270. Such a structure will be described in more detail below with reference to FIG. 6 and FIG. 7.

Figure 6:
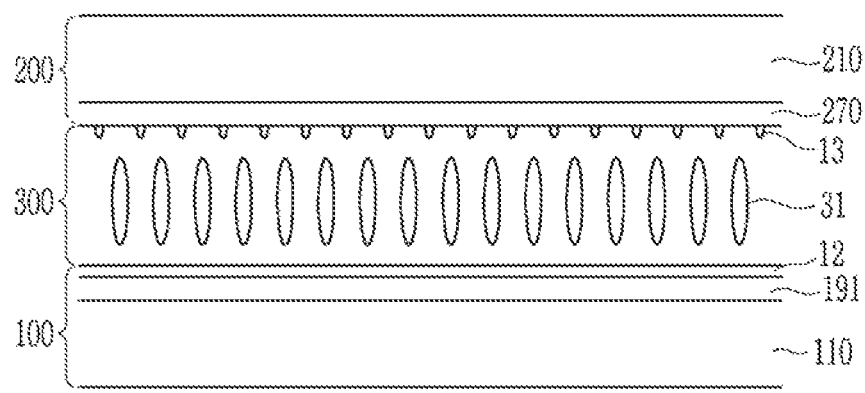
FIG. 6 and FIG. 7 are each cross-sectional view of a liquid crystal display according to an exemplary embodiment of the present invention.
Figure 7:
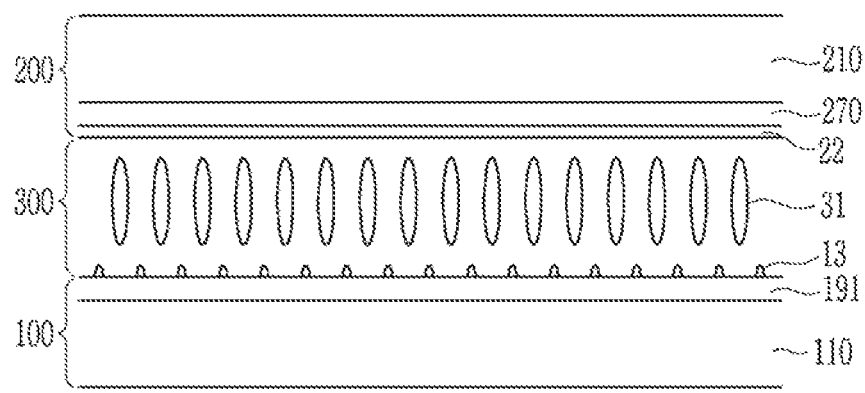

FIG. 6 and FIG. 7 are each cross-sectional view of a liquid crystal display according to an exemplary embodiment of the present invention.

Referring to FIG. 6, the liquid crystal display 1000 according to an exemplary embodiment of the present invention may include the first display panel 100 and the second display panel 200 that face each other, and the liquid crystal display 300 that is disposed between the first display panel 100 and the second display panel 200.

The first display panel 100 may include the first substrate 110, the first electrode 191, and a first alignment layer 12, and the first electrode 191 and the first alignment layer 12 may be sequentially stacked on a side of the first substrate 110. The second display panel 200 may include the second substrate 210, and the second electrode 270 that is disposed on a side of the second substrate 210.

The liquid crystal layer 300 may include a plurality of liquid crystal molecules 31 and a plurality of protrusions 13. The protrusions 13 may be disposed adjacent to the second electrode 270. The protrusions 13 may include a compound represented by Chemical Formula 1 or Chemical Formula 2.

Referring to FIG. 7, the liquid crystal display 1000 according to an exemplary embodiment of the present invention may include the first display panel 100 and the second display panel 200 that face each other, and the liquid crystal display 300 that is disposed between the first display panel 100 and the second display panel 200.

The first display panel 100 may include the first substrate 110 and the first electrode that is disposed on a side of the first substrate 110. The second display panel 200 may include the second substrate 210, the second electrode 270, and a second alignment layer 22. The second electrode 270 and the second alignment layer 22 may be sequentially stacked on a side of the second substrate 210.

The liquid crystal layer 300 may include a plurality of liquid crystal molecules 31 and a plurality of protrusions 13. The protrusions 13 may be disposed adjacent to the first electrode 191. The protrusion 13 may include a compound represented by Chemical Formula 1 or Chemical Formula 2.

The liquid crystal displays according to an exemplary embodiment of the present invention may be curved display devices. In case of a curved display device, when liquid crystal molecules 31 that are adjacent to the first display panel 100 and the second display panel 200 are pre-tilted, misalignment may occur in the first display panel 100 and the second display panel 200, thus causing occurrence of a stain.

Thus, liquid crystal molecules 31 that are adjacent to only one of the first display panel 100 and the second display panel 200 may be pre-tilted and other liquid crystal molecules that are adjacent to the other display panel might not be pre-tilted.

Thus, in a liquid crystal display according to an exemplary embodiment of the present invention e.g., a liquid crystal display described with reference to FIG. 6 and FIG. 7), the protrusions 13 may be adjacent to the second electrode 270 or the first electrode 191 such that adjacent liquid crystal molecules are pre-tilted. However, when the protrusions 13 are not disposed adjacent to the first alignment layer 12 and the second alignment layer 22 and the first alignment layer 12 and the second alignment layer 22 are vertical alignment layers, liquid crystal molecules adjacent to the first alignment layer 12 and the second alignment layer 22 might not be pre-tilted.

While the present invention has been shown and described with reference to the exemplary embodiments thereof, it will be apparent to those of ordinary skill in the art that various changes in form and detail may be made thereto without departing from the spirit and scope of the present invention.

What is claimed is:

1. A liquid crystal display comprising:
   a first display panel and a second display panel that are disposed facing each other;
   a liquid crystal layer that is disposed between the first display panel and the second display panel; and
   a sealant disposed between the first display panel and the second display panel, bonding the first display panel and the second display panel to each other,
   wherein the first display panel comprises a display area, a non-display area adjacent to the display area, and first light blocking members that are disposed in the non-display area,
   the first light blocking members comprise red color filters and blue color filters that are disposed on the red color filters,
   the liquid crystal layer comprises a plurality of liquid crystal molecules and a plurality of protrusions,
   the protrusions are adjacent to at least one of the first display panel or the second display panel, and
   the protrusions comprise a polymer including a compound represented by Chemical Formula 1 or a polymer including a compound represented by Chemical Formula 2:

[Chemical Formula 1]

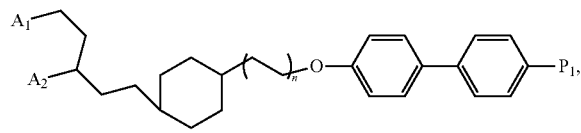

wherein $A_1$ and $A_2$ are each selected from a —H, —OH,

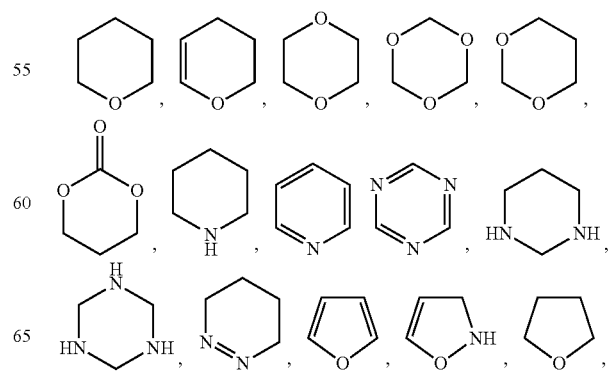

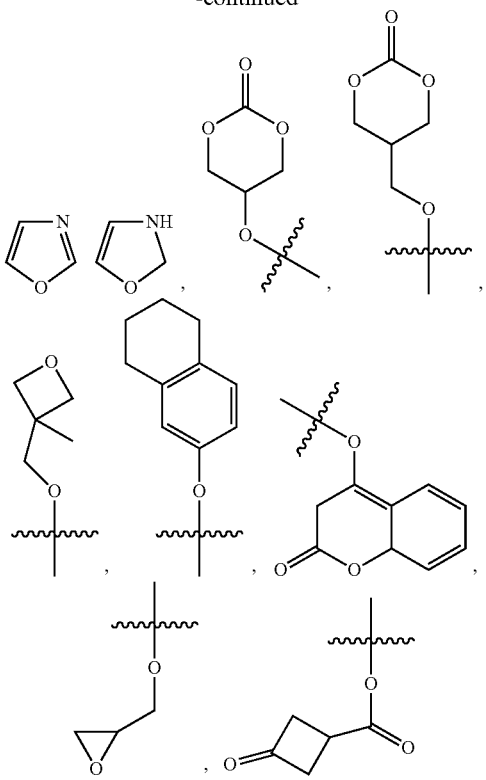

wherein $A_1$ and $A_2$ are not simultaneously —H, $P_1$ is selected from and
n is an integer selected from 1 to 12,

[Chemical Formula 2]

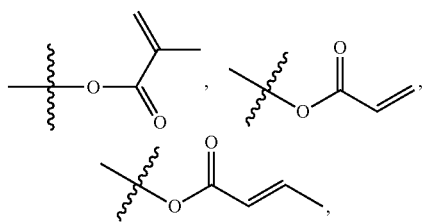

wherein $A_3$ and $A_4$ are each selected from —H, —OH, wherein $A_3$ and $A_4$ are not simultaneously —H, $P_2$ and $P_3$ are each selected from and
x and y are each an integer selected from 1 to 12, wherein x is an integer lower than y.

2. The liquid crystal display of claim 1, wherein the protrusions include a polymer including a compound represented by Chemical Formula 1, and the liquid crystal layer further comprises a reactive mesogen.

3. The liquid crystal display of claim 2, wherein the compound represented by Chemical Formula 1 is a compound represented by Chemical Formula 1-1:

[Chemical Formula 1-1]

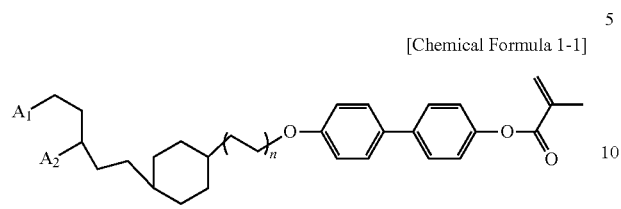

wherein $A_1$ and $A_2$ are each selected from of —H, —OH,

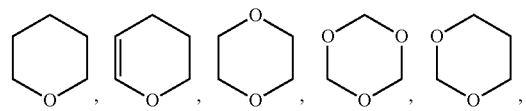

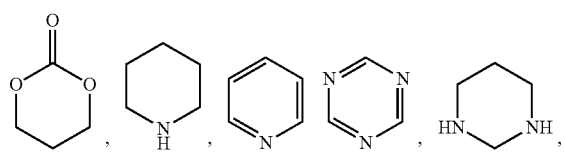

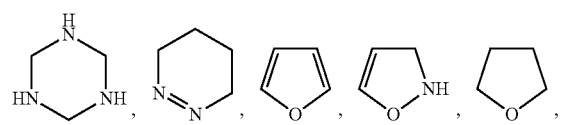

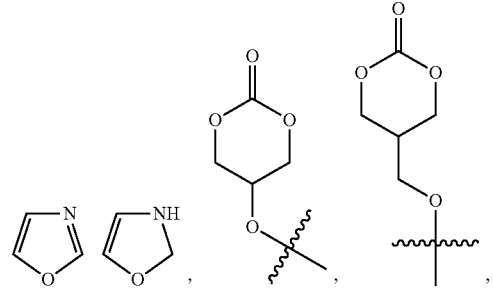

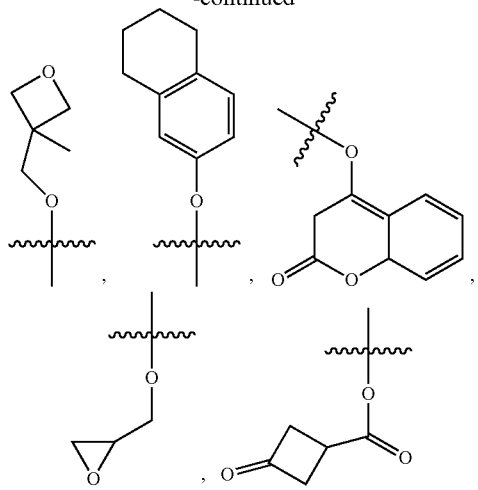

wherein $A_1$ and $A_2$ are not simultaneously —H, and
n is an integer selected from 1 to 12.

4. The liquid crystal display of claim 2, wherein the compound represented by Chemical Formula 1 is a compound represented by Chemical Formula 1-2:

[Chemical Formula 1-2]

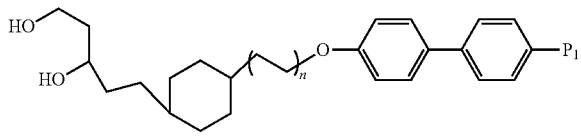

wherein $P_1$ is selected from

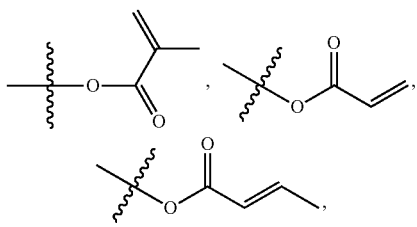

and
n is an integer selected from 1 to 12.

5. The liquid crystal display of claim 2, wherein the compound represented by Chemical Formula 1 is a compound represented by Chemical Formula 1-3:

[Chemical Formula 1-3]

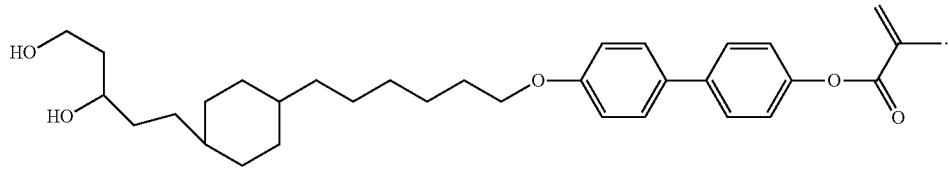

6. The liquid crystal display of claim 1, wherein the protrusions include a polymer including a compound represented by Chemical Formula 2.

7. The liquid crystal display of claim 6, wherein the compound represented by Chemical Formula 2 is a compound represented by Chemical Formula 2-1:

[Chemical Formula 2-1]

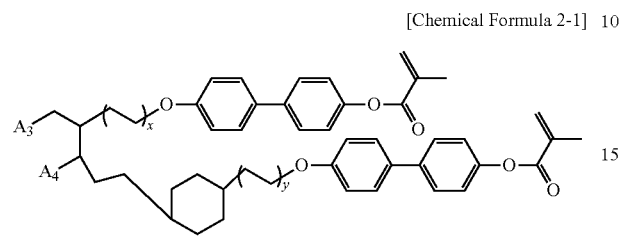

wherein $A_3$ and $A_4$ are each selected from —H, —OH,

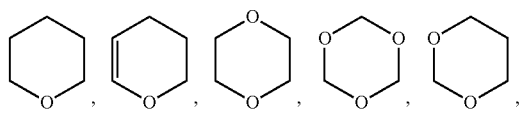

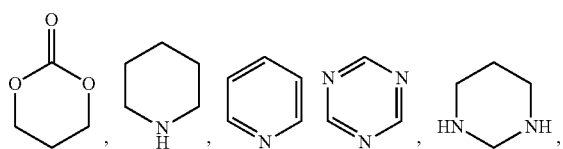

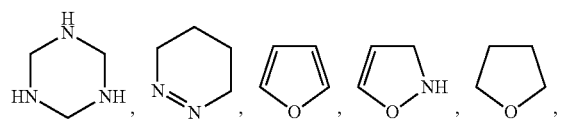

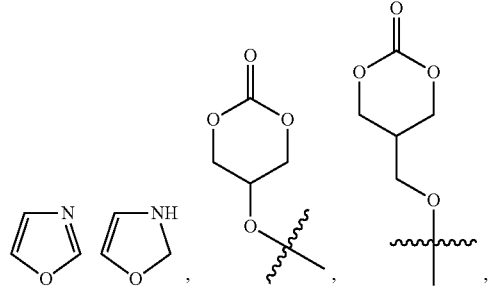

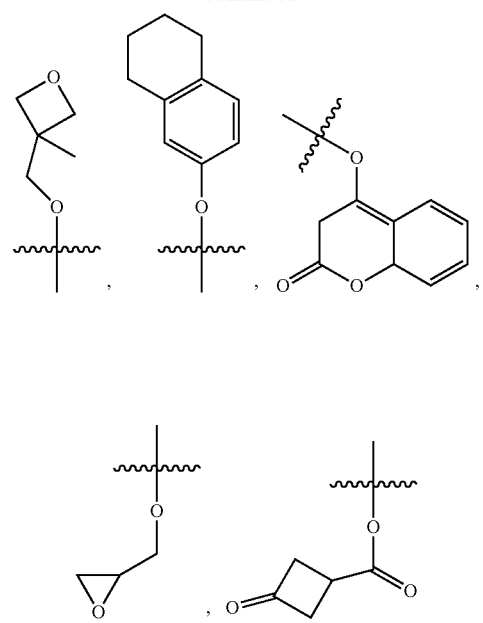

wherein $A_3$ and $A_4$ are not simultaneously —H, and x and y are each an integer selected from 1 to 12, wherein x is an integer lower than y.

8. The liquid crystal display of claim 6, wherein the compound represented by Chemical Formula 2 is a compound represented by Chemical Formula 2-2:

[Chemical Formula 2-2]

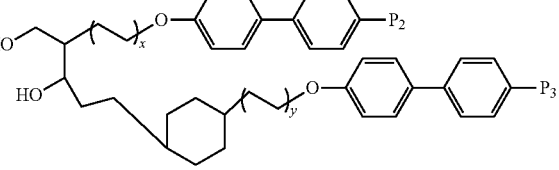

wherein $P_2$ and $P_3$ are each selected from

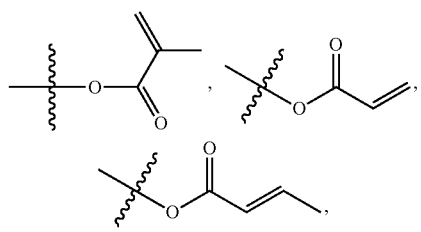

and x and y are each an integer selected from 1 to 12, wherein x is an integer lower than y.

9. The liquid crystal display of claim 6, wherein the compound represented by Chemical Formula 2 is a compound represented by Chemical Formula 2-3:

[Chemical Formula 2-3]

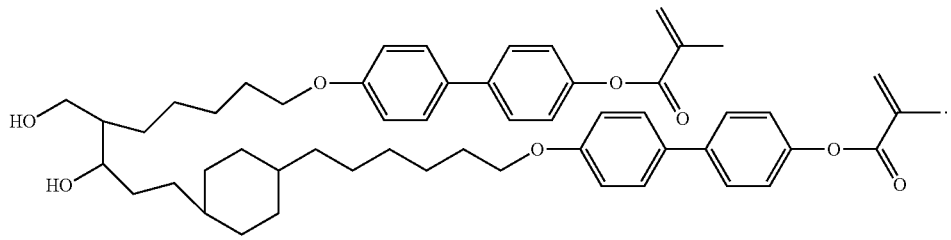

10. The liquid crystal display of claim 1, wherein the sealant is disposed in the non-display area, and the first light blocking members are disposed between the sealant and the display area.

11. The liquid crystal display of claim 1, wherein the first display panel comprises a first substrate and a first electrode that is disposed on a side of the first substrate,
the second display panel comprises a second substrate and a second electrode that is disposed on a side of the second substrate, and
the protrusions are disposed adjacent to each of the first electrode and the second electrode.

12. The liquid crystal display of claim 11, wherein the first electrode comprises a first subpixel electrode and a second subpixel electrode that are disposed apart from each other.

13. The liquid crystal display of claim 12, wherein the first display panel further comprises second light blocking members that are disposed between the first subpixel electrode and the second subpixel electrode.

14. The liquid crystal display of claim 13, wherein the second light blocking members comprise red color filters and blue color filters that are disposed on the red color filters.

15. The liquid crystal display of claim 1, wherein the first display panel comprises a first substrate, a first electrode, and a first alignment layer, wherein the first electrode and the first alignment layer are sequentially stacked on a side of the first substrate, the second display panel comprises a second substrate and a second electrode that is disposed on a side of the second substrate, and the protrusions are adjacent to the second electrode.

16. The liquid crystal display of claim 1, wherein the first display panel comprises a first substrate and a first electrode that is disposed on a side of the first substrate, the second display panel comprises a second substrate, a second electrode, and a second alignment layer, wherein the second electrode and the second alignment layer are sequentially stacked on a side of the second substrate, and the protrusions are adjacent to the first electrode.

17. A liquid crystal display comprising:
a first display panel and a second display panel that face each other;
a liquid crystal layer that is disposed between the first display panel and the second display panel; and
a sealant disposed between the first display panel and the second display panel, bonding the first display panel and the second display panel to each other,
wherein the first display panel comprises a display area, a non-display area adjacent to the display area, and first light blocking members that are disposed in the non-display area, the first light blocking members comprise red color filters and blue color filters that are disposed on the red color filters, the liquid crystal layer comprises a plurality of liquid crystal molecules and a plurality of protrusions, the protrusions are adjacent to the first display panel and the second display panel, and the protrusions comprise a polymer including a compound represented by Chemical Formula 1:

[Chemical Formula 1]

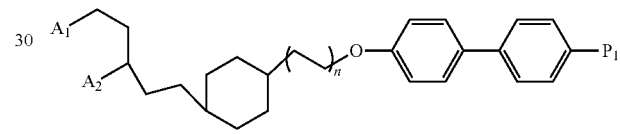

wherein $A_1$ and $A_2$ are each selected from —H, —OH,

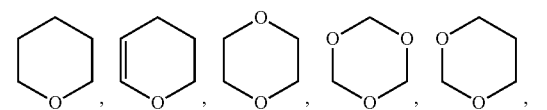

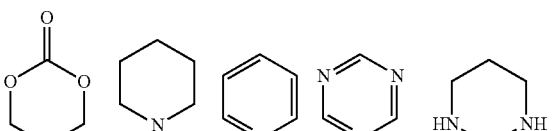

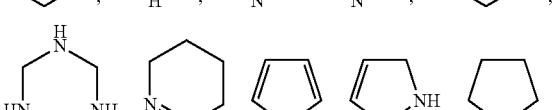

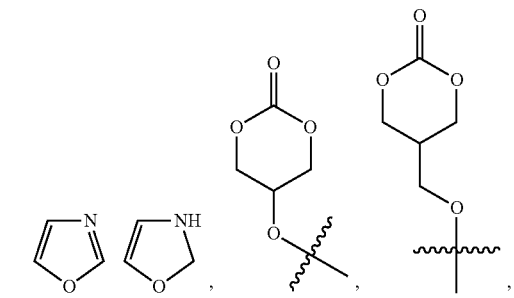

-continued

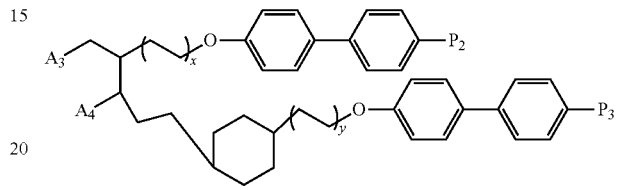

wherein $A_1$ and $A_2$ are not simultaneously —H, $P_1$ is selected from and
n is an integer selected from 1 to 12.

18. The liquid crystal display of claim 17, wherein the compound represented by Chemical Formula 1 is a compound represented by Chemical Formula 1-3:

[Chemical Formula 1-3]

19. A liquid crystal display comprising:

a first display panel and a second display panel that face each other;

a liquid crystal layer that is disposed between the first display panel and the second display panel; and a sealant disposed between the first display panel and the second display panel, bonding the first display panel and the second display panel to each other, wherein the first display panel comprises a display area, a non-display area adjacent to the display area, and first light blocking members that are disposed in the non-display area, the first light blocking members comprise red color filters and blue color filters that are disposed on the red color filters, the liquid crystal layer comprises a plurality of liquid crystal molecules and a plurality of protrusions, the protrusions are adjacent to one of the first display panel or the second display panel, and the protrusions include a polymer including compounds represented by Chemical Formula 2:

[Chemical Formula 2]

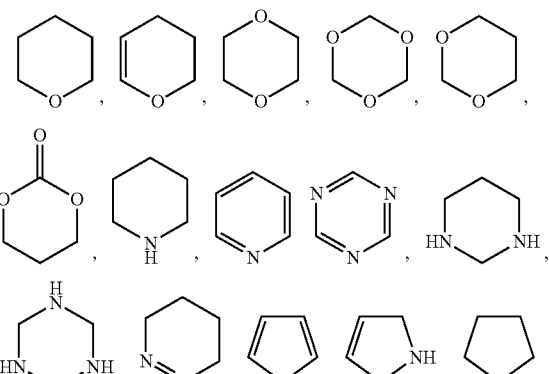

wherein $A_3$ and $A_4$ are each selected from —H, —OH,

-continued

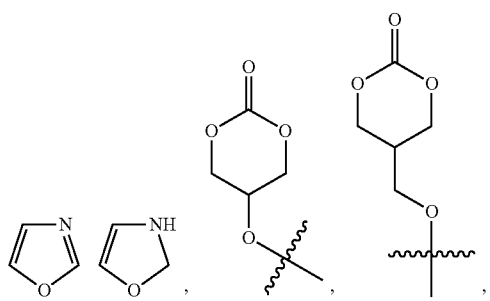

-continued
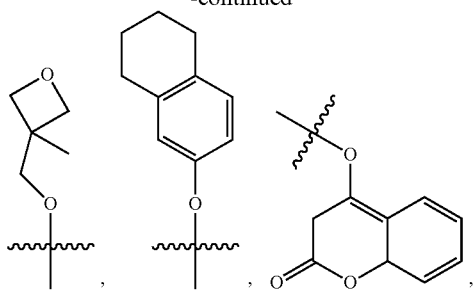
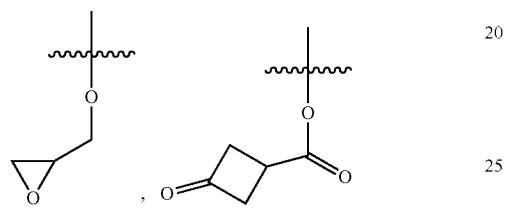
wherein A₃ and A₄ are not simultaneously —H,
P₂ and P₃ are each selected from
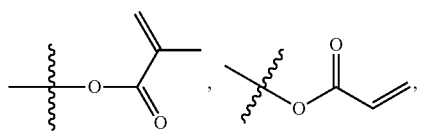
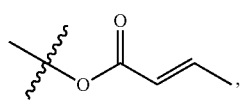
and
wherein x and y are each an integer selected from 1 to 12, wherein x is an integer lower than y.
20. The liquid crystal display of claim 19, wherein the compound represented by Chemical Formula 2 is a compound represented by Chemical Formula 2-3:

[Chemical Formula 2-3]
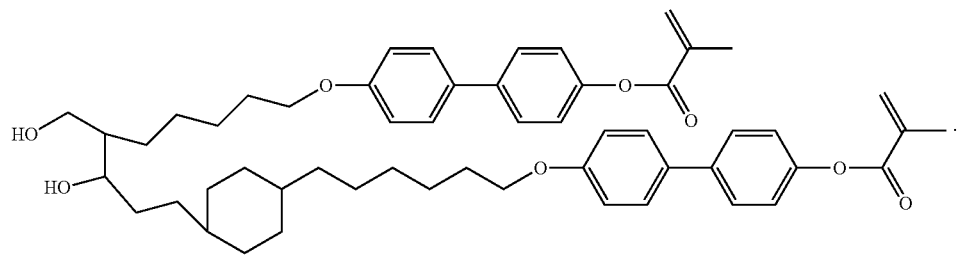
\* \* \* \* \*